Dec. 10, 1963 R. J. PROJAIN 3,114,096

REGULATED VOLTAGE CONVERTER CIRCUIT

Filed Dec. 14, 1961

INVENTOR
R. J. PROJAIN
BY Roy M. Porter Jr.
ATTORNEY

United States Patent Office 3,114,096

Patented Dec. 10, 1963

3,114,096

REGULATED VOLTAGE CONVERTER CIRCUIT

Richard J. Projain, Syosset, N.Y., assignor, by mesne assignments, to Bell Telephone Laboratories, Incorporated, New York, N.Y., a corporation of New York Filed Dec. 14, 1961, Ser. No. 159,242

1 Claim. (Cl. 321—2)

This invention relates to systems for utilizing an available direct-current voltage to produce a different direct-current voltage and, more particularly, to semiconductor oscillator systems for producing a change in direct-current voltage level.

Such a direct-current voltage conversion system first produces an alternating current from an available direct-current voltage by means of switching. The alternating current flows through an inductive circuit and the induced alternating-current voltages are then rectified and filtered to produce a direct-current output voltage. When operated with regenerative feedback, semiconductors have proven to be very good switching elements for such voltage conversion systems. For a detailed description of the initial development of such systems, see Wolfendale, The Junction Transistor and Its Applications, MacMillan 1958, pages 321–379.

The principal problem of the art has been to devise simple, efficient means of holding the output voltage constant when the loading and the direct-current input voltage fluctuate. One way of achieving control of the output voltage is to vary the length of the time that the switching element is made, that is, operating in its high current conduction state. This scheme of control varies the energy delivered to the load regardless of whether energy is delivered to the load during the period of high current conduction of the switching element or during the other part of the switching cycle, or during both.

Heretofore the control signal has been used in a separate current path from the regenerative feedback signal to initiate the process of regenerative switching. Applicant has recognized that unnecessary power losses are thus incurred.

Another problem of this type of circuit has been that, if semiconductor elements are used in the feedback control circuit, the biasing of these elements results in great complication of the circuitry of the system. Generally, battery reference sources or Zener diode circuits have been used to obtain these bias voltages.

It is therefore an object of this invention to reduce power losses in direct-voltage conversion circuits.

It is a further object of this invention to bias the final control element with the regenerative feedback voltage.

According to the invention, the foregoing objects are achieved by arranging the final semiconductor control element with its principal current-conducting path in the same current path with the output of the device which applies the regenerative feedback signal to the switching transistor during the time that the switching transistor is conducting. A first diode connected across said principal path blocks, causing all of the base current of the switching transistor to flow through said principal path whenever the switching transistor is conducting, yet conducts to apply limited reverse bias across said principal path whenever current in the regenerative feedback path flows in the direction which is reversed from the direction of the base current. During the period of reversed current, a second diode connected with reverse polarity across the base-emitter junction of the switching transistor conducts to apply limited reverse bias to that base-emitter junction.

Power losses are minimized because it is then possible to operate the regenerative feedback and the control feedback elements at the lowest possible power levels. Because of the blocking action of the first diode, both the final regenerative feedback element and the principal current-conducting path of the final semiconductor control element carry all of the base current of the transistor which operates as the switching device. Then both minimal current and minimal voltage levels result for both the final regenerative feedback element and the final feedback control element. The principle is that, wherever power levels are lowest, both the final regenerative feedback and the final control feedback elements will be there.

Further, striking economy of structure results from the fact that the final semiconductor control device has forward bias for its principal path during the only time that it needs it, that is, during the time of high current conduction of the switching transistor.

Further objects, features, and advantages of the invention will become apparent from the following detailed description in conjunction with the drawing, in which.

Figure 1:
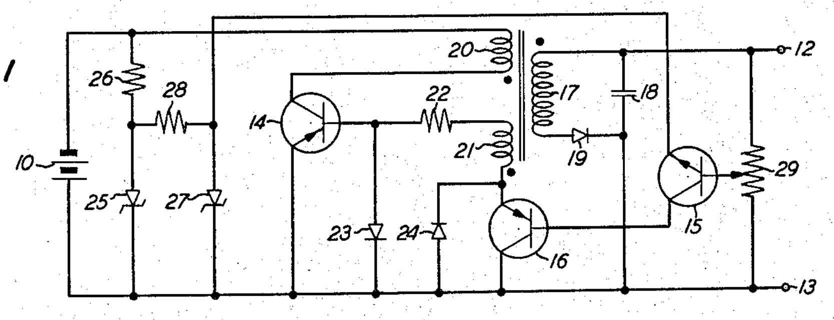
FIG. 1 is a schematic diagram of the preferred embodiment of the invention.

In FIG. 1, direct-current voltage source 10 supplies the available voltage which is to be used as the input to the circuit. The over-all object of the system is to obtain a different and well-regulated direct-current voltage at terminals 12 and 13.

Transistor 14 is the switching device for the converter circuit. Its emitter and collector electrodes, primary inductive winding 20, and input voltage 10 are connected in a closed electrical loop. The emitter electrode is connected to the positive terminal of the battery as a common or ground point when transistor 14 is a PNP transistor, as shown in FIG. 1.

However, PNP transistor 14 might be replaced with an NPN transistor, in which case the voltage polarity would be reversed and other corresponding changes made, or with any of a great variety of semiconductor switching elements.

Regenerative inductive winding 21 is coupled electromagnetically with primary inductive winding 20 and with output inductive winding 17. Regenerative inductive winding 21, resistance 22 and the emitter and collector terminals of control transistor 16 are connected in closed electrical loop with the base and emitter terminals of switching transistor 14, with winding 21 oriented to draw current from the base of transistor 14 when the conduction current in primary inductive winding 20 is increasing, and with the emitter and collector terminals of control transistor 16 oriented to be forward-biased by the voltage of regenerative winding 21 when the latter is drawing current from the base of switching transistor 14.

Protective diode 24 is connected between the collector and emitter terminals of control transistor 16 and oriented to conduct when the induced voltage of regenerative winding 21 reverse-biases the emitter-collector junction of transistor 16. Protective diode 23 is connected between the base and emitter electrodes of switching transistor 14 and oriented to conduct when the induced voltage of regenerative winding 21 reverse-biases the emitter-base junction of transistor 14. Resistance 22 is chosen to limit current flow when the induced voltage of regenerative winding 21 is reverse-biasing the emitter-base junction of transistor 14 without unduly limiting the base current when regenerative winding 21 is drawing current from the base of transistor 14.

Output inductive winding 17, although shown as a separate winding, might include primary winding 20 in accordance with autotransformer principles, in which case rearrangement would be necessary because of the shift in potential levels in the output circuit. Output inductive winding 17, rectifying junction 19, and output filtering capacitor 18 are connected together in a closed loop with rectifying junction 19 oriented to deliver energy to the output circuit during the portion of the cycle during which switching transistor 14 is in a state of low, or no, current conduction. Therefore, the preferred embodiment of the invention operates as a ringing choke converter circuit, according to the terminology of the art. Rectifying junction 19 might as well have the other orientation, in which case the system would operate as a transformer-coupled converter circuit. Also, arrangements are possible in which energy is delivered to the output circuit during both parts of the cycle.

Transistor 15 and voltage divider 29 are a means of sensing the output voltage without unduly loading the output circuit. The base of transistor 15 is connected to a point on voltage divider 29 which corresponds to a predetermined portion of the output voltage. The emitter of NPN transistor 15 is connected to Zener diode 27, which provides a reference voltage, which ideally should be as constant as possible. The collector of transistor 15 is connected to the base of control transistor 16. Transistor 15 senses and compares the selected portion of the output voltage with the reference voltage and varies the emitter-collector impedance of control transistor 16 in response to the comparison. The functions of elements 15 and 16 might be combined in one element if a semiconductor element is available which has more than three electrodes and provides sufficient isolation to prevent undue loading of the output circuit. In particular, transistors 15 and 16 need not be of the conduction types shown. For example, if the circuit is reconnected as a transformer-coupled converter, one way of adapting the comparison circuitry thereto is to replace NPN transistor 15 with a PNP transistor. Then the polarity of the reference voltage should be reversed and another phase reversal should be obtained somewhere in the circuit.

The reference voltage for comparator transistor 15 is obtained from the network of resistor 26 and Zener diode 25, which are connected in a closed loop with input voltage 10 with Zener diode 25 oriented to carry current from cathode to anode, and resistor 28 and Zener diode 27, which are connected in an overlapping closed loop with Zener diode 25. Fluctuations in the input voltage will tend to appear primarily across resistor 26; any fluctuations in the regulated voltage across Zener diode 25 will tend to appear across resistor 28. Thus, two-stage reference voltage regulation can be achieved; and the principle can obviously be extended to any number of stages. Obtaining the reference voltage from the input circuit has the advantages of avoiding the use of a separate battery source while simultaneously avoiding loading of the output circuit.

In operation, input voltage 10 is applied to the series combination of the emitter-collector circuit of transistor 14 and primary inductive winding 20. After the circuit has been in operation some time, primary current will not start to build up until output inductive winding 17 has delivered virtually all of the stored energy of the magnetic field to output filtering capacitor 18. A very small portion of that stored energy has been stored in the distributed capacitance of windings 17, 20, and 21 at the time rectification ceases. That small portion causes the voltage of regenerative winding 21 to swing back in a direction to forward-bias the base-emitter junction of switching transistor 14. Thus, its emitter-collector impedance will be lowered sufficiently that current will start to build up in primary inductive winding 20. The increase of current in winding 20 induces a voltage in regenerative winding 21 which increases the base current of transistor 14 and drives its emitter-collector impedance toward a minimum obtainable value. However, this impedance cannot reach its minimum value if the magnitude of the predetermined portion of the output voltage has not fallen below the magnitude of the reference voltage. The importance of this voltage difference in controlling the length of time transistor 14 remains in its minimum impedance condition, or saturation, will be more fully explained hereinafter. For the most efficient operation, the circuit is designed for normal load so that the peak of the output voltage ripple lies at or near "K" times the reference voltage, $V_{REF}$, where K is the ratio of the whole resistance of voltage divider 29 to the resistance of the portion of voltage divider 29 between the base of transistor 15 and terminal 13. Then, transistor 14 attains its minimum impedance soon after it is switched on and goes into saturation, the loop gain through transistor 14 and its regenerative feedback loop becoming less than unity. This mode of operation is illustrated by curve 42 of FIG. 2.

Figure 2:
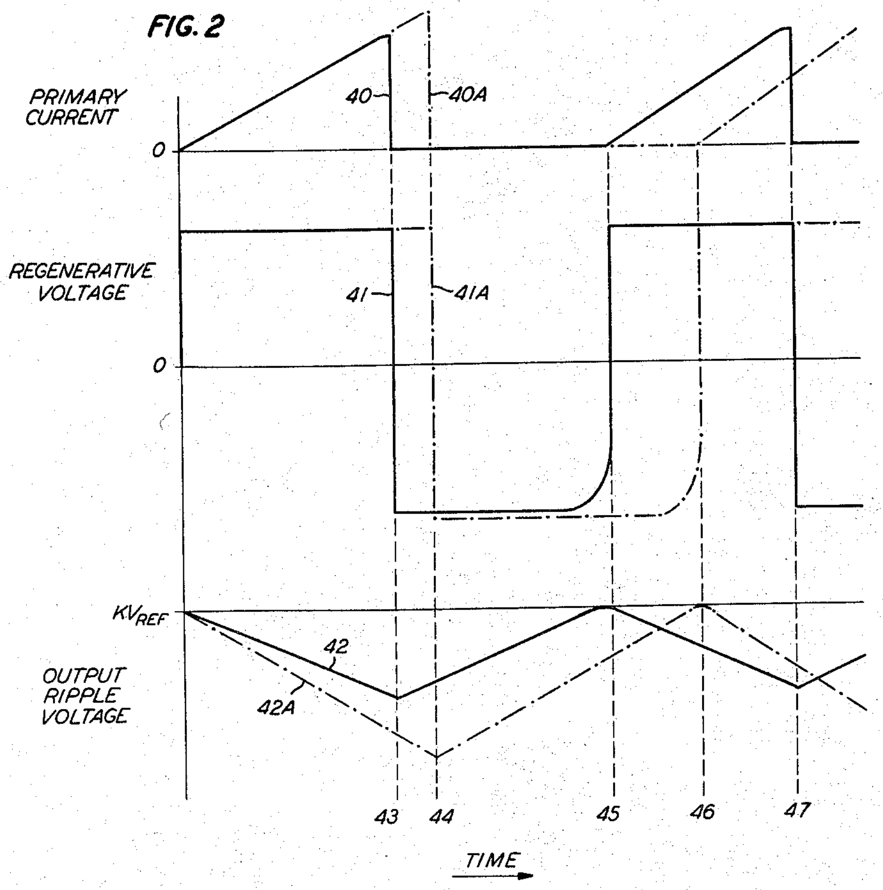
FIG. 2 shows curves which are useful in explaining the theory and operation of the invention.

Actual operation has shown that the net result is that the current in primary winding 20 experiences a nearly linear buildup, as shown in the first part of curve 40 of FIG. 2. This means that the voltage in winding 21 remains nearly constant, as shown by the first part of curve 41 of FIG. 2, and provides a nearly constant bias for control element 16, biasing it in a direction to promote current conduction through control element 16.

In this portion of the operation, the magnitude of the output voltage continues to decline, as shown in the first part of curve 42 of FIG. 2, since output winding 17 and rectifying junction 19 are oriented to prevent output winding 17 from delivering energy to the output circuit. The voltage decline, though exponential in nature, will appear to be essentially linear if the percentage of voltage change across capacitor 18 is held to a small amount. The only function of this portion of the cycle, in the ringing choke converter embodiment shown, is to build up the stored energy of the electromagnetic field of primary winding 20. The higher this stored energy, the greater will be the energy delivered to the output circuit when switching element 14 is broken.

Switch-off will occur when the collector current of transistor 14 approaches the maximum value sustainable by the then-existing base current. It is commonly said that transistor 14 comes out of saturation at this point. Then, as illustrated by the slight rounding of the peak of the wave in curve 40 of FIG. 2, the rate of increase of current in winding 20 must fall to the point that the induced voltage in winding 21 is no longer sufficient to sustain the base current corresponding to the then-existing level of current in primary winding 20. This condition results in the initiation of a decrease in the current in primary winding 20, which decrease reverses the induced voltage in windings 21 and 17, as shown for the terminal voltage of regenerative winding 21 by the part of curve 41 between points 43 and 45 in FIG. 2. The voltage of output winding 17 is of a polarity that rectifying junction 19 will rectify, and thus it will charge capacitor 18 and produce a voltage increase across capacitor 18 and output terminals 12 and 13, as shown by the part of curve 42 between points 43 and 45 in FIG. 2.

The collapse of the magnetic field within the coupled windings and the current flow from winding 17 to capacitor 18 and the output circuit produce terminal voltages of windings 21 and 17 which are nearly flat because of the clamping action of capacitor 18, whose stored energy varies by a very small percentage throughout a cycle. Also, the rise of the output voltage is nearly linear during the time that the stored energy of the inductive circuit is being delivered to the output circuit. Of course, dynamic considerations demand a rounding off of these characteristics as the stored energy of the inductive circuit nears zero. This rounding off is shown near point 45 in FIG. 2 for both curves 41 and 42. The terminal voltages of windings 21 and 17 are so much less than the open-circuit induced voltages would be, that the voltage step-up and output wave form are both comparable to that obtained in a transformer-coupled circuit.

The long-sustained delivery of energy to the output circuit means that a relatively small percentage of the energy is lost in the regenerative feedback circuit, by current through resistance 22 and diodes 23 and 24. The energy loss can be held to an amount just sufficient to reverse-bias firmly the emitter-base junction of switching transistor 14 and the emitter-collector junction of control transistor 16 during the time that energy is being delivered to the output circuit because the regenerative feedback voltage is fairly flat and can be made moderate.

At time 45 on curves 40, 41, and 42 of FIG. 2, the energy-delivery portion of the cycle is complete. At that time, a new cycle of high current conduction of transistor 14 can commence, as described above.

The correction operation of the feedback control circuit may be explained by assuming that the magnitude of the output voltage declines at an unexpectedly high rate, as illustrated in curve 42A of FIG. 2. The base of transistor 15 becomes less negative than its emitter by an increasing amount. NPN transistor 15 becomes increasingly forward-biased, thereby increasing its own collector current and the base current of control transistor 16. At time 43 at which switch-off normally occurs, the emitter-collector impedance of control transistor 16 is much lower than normal. Therefore, a higher base current of switching transistor 14 results, and a corresponding higher maximum obtainable collector current of transistor 14 permits the current buildup in primary winding 20 to continue, as illustrated in curve 40A of FIG. 2, before transistor 14 comes out of saturation. The emitter-collector impedance of transistor 14 remains at its minimum value until the maximum collector current corresponding to the increased base current is reached, as explained above. A greater storage of electromagnetic energy in the field of winding 20 occurs than occurred in curve 40 because the stored energy is proportional to the square of the peak current in winding 20.

This buildup of peak current and hence stored energy is considerably aided by minimizing power losses in the regenerative feedback and feedback control circuitry. Or, from the dynamic point of view, the current in winding 20 is maximized by maximizing the base current of transistor 14 so that transistor 14 can pass the greatest possible collector current and by minimizing the voltage drops which appear between winding 20 and the input voltage so that the largest possible voltage drop appears across winding 20. The latter condition means that both the regenerative feedback circuitry and feedback control circuitry should appear in the base circuit of transistor 14; in that position they do not take any of the input voltage away from winding 20. The former condition means that all current flowing in the regenerative winding 21 should be drawn from the base of transistor 14, and not from any alternative sources. More collector current can then be obtained with less copper losses. The circuitry of FIG. 1 satisfies both requirements.

The invention is directed at the part of the oscillation cycle which is the most critical from the standpoint of regulation, namely, the part of the oscillation cycle in the vicinity of the peak current of the primary winding. Higher stored energy in the field of winding 20 means more energy delivered to the output circuit than was previously the case. This fact may be illustrated as follows:

When switch-off of transistor 14 occurs, the flattening of the terminal voltages of windings 17 and 21, in a manner like that previously discussed and as illustrated for winding 21 during the control action by curve 41A of FIG. 2, means that the magnitude of these voltages will be only slightly increased, but that their duration will be appreciably increased. The duration of energy delivery to the output circuit is correspondingly increased. With the energy delivered to the output circuit thus increased, the predetermined portion of the output voltage should, for proper control adjustment, be brought back closer to the reference voltage than would have occurred without the correction action.

With respect to the biasing objective of the invention, it will be noted that the voltage of regenerative feedback winding 21 provides a conduction bias for transistor 16 during the period of high current conduction of transistor 14. This condition of current conduction bias for transistor 16 begins when nearly all the energy stored in the magnetic field of the coupled windings has been either delivered to capacitor 18 and the load circuit or dissipated in resistor 22, the forward resistances of diodes 23 and 24, and internally in the windings. It will be noted that the period of high current conduction of transistor 14 is the only time that control element 16 needs a current conduction bias because during the other portion of the cycle, transistor 16 can be allowed to remain in a nonconduction state regardless of the condition of the output voltage. The basic hypothesis of the control system is that only the length of the period of high current conduction by switching transistor 14 is to be controlled. Although the length of the other part of the cycle varies, it is not directly controlled. Thus, the invention exhibits the unique phenomenon of a semiconductor bias source which provides bias only when needed.

This application is filed concurrently with the application of R. E. D. Anderson and applicant, Serial No. 159,243, filed December 14, 1961, for their invention of a related circuit.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

A converter circuit having an input to which a direct-current voltage may be applied, an output including a rectifier-filter for producing a direct-current voltage, and a transistor oscillator connected between said input and said output, said transistor oscillator comprising a power transistor having an emitter electrode connected to one terminal of said input and having a collector electrode and a base electrode, a transformer having a primary winding connected serially between said power transistor collector electrode and the other terminal of said input, said transformer having a feedback winding included in a series circuit connected between said power transistor base electrode and said one terminal of said input and oriented to promote base current in said power transistor base electrode when current in said primary winding is increasing, said transformer further having an output winding connected across said rectifier-filter, a source of a stabilized reference voltage, a comparator transistor having a collector electrode and having base and emitter electrodes across said reference voltage source and a portion of said output are connected in series opposition, said reference voltage source being oriented for promoting current in said comparator transistor base electrode, a control transistor having a base electrode and having emitter and collector electrodes connected in said series circuit including said feedback winding between said power transistor base electrode and said one terminal of said input, said control transistor emitter and collector electrodes being oriented for carrying said base current of said power transistor, said control transistor base and emitter electrodes being connected serially with said reference voltage source across said comparator transistor collector and emitter electrodes for controlling the impedance between said control transistor emitter and collector electrodes in response to the voltage across said portion of said output, a first diode connected across said control transistor emitter and collector electrodes with a polarity for preferentially conducting current in a direction which reverse biases said control transistor emitter and collector electrodes, and a second diode connected across said power transistor base and emitter electrodes with a polarity for preferentially conducting current in a direction which reverse biases said power transistor emitter and base electrodes.

References Cited in the file of this patent

UNITED STATES PATENTS

| | | |
|---|---|---|
| 2,854,614 | Light | Sept. 30, 1958 |
| 2,959,745 | Grieg | Nov. 8, 1960 |
| 2,968,738 | Pintell | Jan. 17, 1961 |
| 3,012,181 | Schultz | Dec. 5, 1961 |